United States Patent [19]

Elliott

[11] Patent Number: 4,818,378
[45] Date of Patent: Apr. 4, 1989

[54] MAGNETIC CONVEYOR WITH MULTIPLE SPIRAL RAMPS

[76] Inventor: Eldon G. Elliott, 7397 Kingsbridge, Canton, Mich. 48187

[21] Appl. No.: 26,636

[22] Filed: Mar. 17, 1987

[51] Int. Cl.⁴ .......................... B03C 1/02; B65G 17/46
[52] U.S. Cl. .................................... 209/225; 198/619; 198/690.1; 209/229
[58] Field of Search ................ 209/219, 220, 225–231, 209/223.2; 210/222; 198/690.1, 619, 691

[56] References Cited

U.S. PATENT DOCUMENTS

| | | | |
|---|---|---|---|
| 912,363 | 2/1909 | Charlton | 209/219 |
| 1,948,419 | 12/1934 | Granigg | 209/221 |
| 3,759,367 | 9/1973 | Elliott | 198/523 |
| 3,952,857 | 4/1976 | Nazuka | 198/619 |
| 4,451,360 | 5/1984 | Salmi | 209/230 |

FOREIGN PATENT DOCUMENTS

| | | | |
|---|---|---|---|
| 0045823 | 3/1986 | Japan | 198/619 |
| 44346 | of 1958 | Poland | 198/619 |
| 38367 | 1/1913 | Sweden | 209/230 |

*Primary Examiner*—James B. Marbert
*Assistant Examiner*—Donald T. Hajec
*Attorney, Agent, or Firm*—Reising, Ethington, Barnard, Perry & Milton

[57] ABSTRACT

An apparatus (10) for handling parts (a,a') by magnetic attraction includes a cylindrical casing (18) of nonmagnetic material having an uninterrupted surface throughout its length and a magnet (20) for magnetically attracting parts (a,a') to the casing (18). Nonmagnetic ramps are spirally wound around the casing (18). A drive mechanism (26) rotates the magnet (20) relative to the ramp. The magnet (20) attracts the parts to the casing (18) and causes the parts (a,a') to rotate about the axis of the casing (18) while the ramps (30) cause the parts (a,a') to advance along the length of the casing (18). The ramps (30) include a multiple part segregating mechanism for segregating parts received and discharged along the length of the casing (18).

11 Claims, 1 Drawing Sheet

MAGNETIC CONVEYOR WITH MULTIPLE SPIRAL RAMPS

FIELD OF THE INVENTION

This invention relates generally to article handling apparatus and is particularly concerned with magnetic article sorting, parts handling, and/or parts storage apparatus and systems.

DESCRIPTION OF RELATED ART

In many industrial processes, it is necessary to separate magnetically attractive parts from nonmagnetic material. Generally, the parts are bathed in a liquid slurry and it is necessary to recover the metal parts.

The U.S. Pat. No. 3,759,367 to Elliott, the inventor of the present invention, issued Sept. 18, 1973 discloses a magnetic conveyor having a single helix wound around an elongated hollow casing of nonmagnetic material. Magnetic means, which can comprise either electromagnets or permanent magnets, are housed within the nonmagnetic casing. Other examples of patents disclosing assemblies magnetically separating parts and not including a rotating spiral helix are the U.S. Pat. Nos. 1,605,117 to Koizumi, issued Nov. 2, 1926 and 4,062,443 to Wallace, issued Dec. 13, 1977.

The prior art patent provides means for separating a ferromagnetic material from a nonmagnetic material by selectively advancing the ferromagnetic material from a non-ferromagnetic material. However, present day assembling procedures would benefit from a means for segregating different or the same ferromagnetic materials in a single process by a single apparatus. In view of this problem, the present invention provides means for selectively advancing ferromagnetic material along a nonmagnetic tube from separate in-feed stations to separate discharge stations on a single tubular structure.

SUMMARY OF THE INVENTION

The present invention provides an apparatus for handling parts by magnetic attraction including a cylindrical casing of nonmagnetic material having an uninterrupted surface throughout its length and magnetizing means for magnetically attracting parts to the casing. Nonmagnetic ramp means are spirally wound around the casing. Drive means rotates the magnetic means relative to the ramp means to cause the parts to rotate about the axis of the casing while the ramp means causes the parts to advance along the length of the casing. The ramp means includes multiple parts segregating means for segregating parts received and discharged along the length of the casing.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
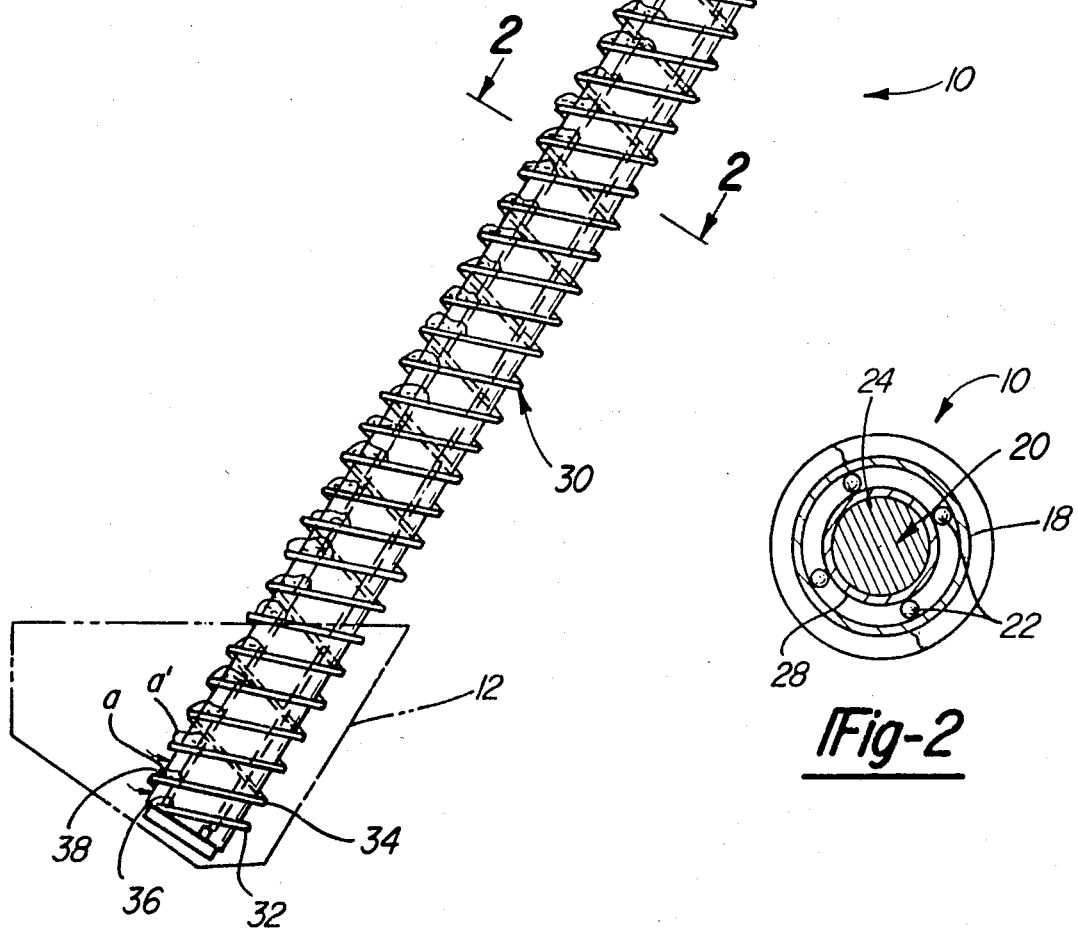
FIG. 1 is an elevational view partially in section of an apparatus embodying the invention.

An apparatus for handling parts by magnetic attraction constructed in accordance with the present invention is generally shown at 10 in the Figures.

The apparatus 10 is used to transfer parts a,a' from a supply schematically shown at 12 at the lower end of the apparatus 10 to a plurality of removable discharge chutes 14,16 at the upper end of the apparatus 10.

The apparatus 10 includes an elongated hollow cylindrical casing 18 made from a nonmagnetic material. For example, the casing 18 can be made from a stainless steel tube. The casing 18 has an uninterrupted surface throughout its length. An elongated magnetic core assembly 20 is disposed within the casing 18, the magnetic core 20 being rotatably received in the casing 18.

Figure 2:
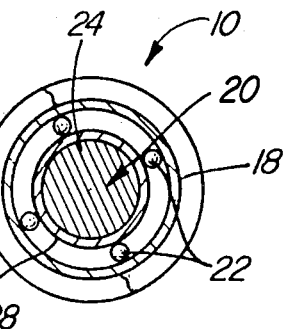
FIG. 2 is a cross sectional view taken on lines 2—2 of FIG. 1.

As shown in FIG. 2, a plurality of rollers 22 are mounted on the magnetic core assembly 20 and engage the inner surface of the casing 18 to provide support for the magnetic core 20 in a direction transverse to the axis of the casing 18, and to prevent the casing 18 from collapsing inwardly from the force exerted by the articles a,a' due to the attraction of the magnetic core 20.

The magnetic core assembly 20 includes a driven shaft 24 operatively connected with a motor 26. Energization of the motor 26 causes rotation of the shaft 24. A magnetic core 28 is secured to the shaft 24. As disclosed in the U.S. Pat. No. 3,759,367, the magnetic core can include a pair of elongated steel support bars mounted on diametrically opposed sides of the axis of the shaft 24, or may comprise a magnetic mounted on support arms in such a manner that the north pole of the magnet of one of the arms is adjacent to the south pole of the magnet of an adjacent support arm. Other arrangements of the magnets may be utilized in conjunction with the present invention wherein the magnets magnetically attract parts a,a' to the casing 18.

The assembly 10 includes ramp means generally indicated at 30 for causing the parts a,a' to advance along the length of the casing 18. The ramp means 30 includes multiple parts segregating means for segregating parts advancing along the length of the casing 18.

More specifically, the multiple part segregating means includes a pair of ramps 32,34 of nonmagnetic material wound spirally along the length of the casing 18. The ramps 32,34 are wound spirally about the outer surface of the casing 18 although other orientations of the ramps to the casing are possible. Ramp 32 collects and discharges parts a and ramp 34 collects and discharges parts a', the ramps 32,34 keeping the parts a,a' separated throughout the length of travel along the length of the assembly 10.

Each of the ramps 32,34 has an in-feed end 36,38 and a discharge end 40,42, respectively. The in-feed ends 36,38 are operatively connected to an in-feed part source 12 and the discharge ends 40,42 are operatively connected to the removable discharge chutes 14,16, respectively, for receiving the discharged parts a,a'.

As shown in FIG. 1, both in-feed ends 36,38 are contained in a single in-feed part source 12. Alternatively, each in-feed end 36,38 could receive different parts from different part sources anywhere along the length of the assembly 10. Each of the discharge ends 40,42 are operatively connected to separate discharge chutes 14,16. Alternatively, one or both of the ramps 36,38 can extend over only a portion of the casing 18 and either pick up or discharge parts from portions of the casing 18 intermediate the ends of the casing 18.

A discharge sweeper 44,46 may be necessary to assist gravity for the removal of light ferrous chips and fines that are slow to fall free from the magnetic field and discharge chute upon rotation of the magnets 20. The magnets 20 are made up of one, two or more separate magnetic fields (depending on the number magnets used). The elements rely upon the nonmagnetic areas between the magnetic fields for a release and discharge. The discharge sweepers 44,46 are made from small strips (one or more) of ferrous steel, wire, cable, or chain, (as illustrated in the Figures) and are attached at one end 48,50 and free at the other ends 52,54 to swing into and out of the discharge areas 40,42.

The discharge sweepers 44,46 are made from ferrous material and suspended in front of the discharge areas 40,42. The discharge sweepers 44,46 utilize the interior sealed rotating magnetic elements 20 as its means of motion. The magnetic elements 20 rotating inside of the tube 18 held collected ferrous chips and fines for movement up the exterior spiral 30 of the device 10. When collected ferrous material reaches the discharge areas 40,42 the strong magnetic field pulls the ferrous sweepers 44,46 into the path of the collected ferrous material that are ready for discharge. The ferrous chips and fines attach themselves directly to the discharge sweeper because the metallic discharge sweepers 44,46 remain in the magnetic field. Thus, all the metal chips and fines are transferred onto the sweeper 44,46. The sweeper 44,46 then moves around the tube 18 with the rotating interior magnetic element 20 to discharge deadplate 56. At this point, the heavy, fast falling discharge sweepers 44,46 is released from the magnetic field and is free to fall away thereby discharging the collected chips and fines. The discharge sweepers 44,46 then hang in a neutral position until a magnetic element once again pulls the discharge sweepers 42,46 back into the strong magnetic field to repeat the cycle over again.

Unlike prior art assemblies wherein parts are carried from a single source and discharged at a single discharge end, the present invention provides ramp means allowing too, three or more individual ramps in the form of helixes or spiral ramps to be spaced onto the cylindrical tube 18 so that each of the ramps has a common or separate in-feed end and discharge area located at desired points along the length of the casing 18. Individual discharge trays or chutes can be removable and be positioned by the attachment of metal screws anywhere along the tube 18.

The multiple ramp assembly allows a single apparatus to carry two, three, or more different parts on the same cylindrical casing 18 while keeping them separated for discharge. Further, the apparatus can feed the same part of multiple collection bins or assembly stations with a smooth meter discharge from each discharge chute.

The apparatus can operate in any position, vertical to horizontal, the only limitation being the relationship to the weight of the carried part to the force of the magnetic field directed along the length of the casing 18.

As disclosed in the previously cited Elliott patent, the ramps can be positioned further apart at the in-feed area and merged closer to one another at the discharge ends to thin out parts into a single lane off of the discharge.

The multiple ramps increase the capacity of the apparatus because each ramp carries a maximum amount of parts for the full length of the apparatus. Accordingly, the apparatus can run at a slower RPM in comparison to prior art apparatus having single ramps.

When the apparatus is used in parts washing or parts coating applications, tanks for washing or coating can be much smaller in size because the part traveling on the casing is approximately four feet around the casing to one foot of linear travel along the casing. The conveyor may operate at an almost horizontal position for this application.

The invention has been described in an illustrative manner, and it is to be understood that the terminology which has been used is intended to be in the nature of words of description rather than of limitation.

While specific embodiments of the invention have been illustrated in the accompanying drawings and described in the foregoing specification, it should be understood that the invention is not limited to the specific construction shown. Alternatives in the construction and arrangement of parts, all falling within the scope and spirit of the invention, will be apparent to those skilled in the art.

What is claimed:

1. An apparatus (10) for handling parts (a,a') by magnetic attraction comprising: a cylindrical casing (18) of nonmagnetic material having an uninterrupted surface throughout its length; magnetizing means (20) for magnetically attracting parts (a,a') to said casing (18); nonmagnetic ramp means spirally wound around said casing (18); and drive means (26) for rotating said magnetic means (20) relative to said ramp means to cause the parts (a,a') to rotate about the axis of said casing (18) while said ramp means (30) causes said parts (a,a') to advance along the length of said casing (18), characterized by said ramp means (30) including multiple part segregating means for separately receiving parts from a source and segregating the parts (a,a') received and discharged along the length of said casing (20), said multiple part segregating means including a plurality of ramps (32,34) of nonmagnetic material wound spirally around the length of said casing (18), each of said ramps (32,34) having an in-feed end (36,38) and a discharge end (40,42), said in-feed ends (36,38) being contained within a single in-feed part source (12) and said discharge ends (40,42) being operatively connected to discharge receiving means for receiving the segregated discharged parts.

2. An apparatus as set forth in claim 1 further characterized in said ramps (32,34) being wound spirally about the outer surface of said casing (18).

3. An apparatus as set forth in claim 1 further characterized by each of said discharge ends (40,42) being operatively connected to separate discharge receiving means (14,16).

4. An apparatus as set forth in claim 1 further characterized by at least one of said ramps (36,38) extending over a portion of the length of said casing (18), at least one of said in-feed ends and discharge ends being spaced from the end of said casing (18).

5. An apparatus as set forth in claim 1 further characterized by said ramp means (30) being wound around the outer surface of said casing (18).

6. An apparatus as set forth in claim 1 further characterized by including part discharge sweeper means (44,46) for assisting gravity for the removal of light ferrous chips and fines to fall free from said magnetizing means (20) and being discharged upon rotation of said magnetizing means (20).

7. An apparatus as set forth in claim 6 further characterized by said ramp means (30) including at least one discharge area (40,42), said sweeper means (44,46) including a ferrous element mounted at said discharge area (40,42) and having a fixed end mounted on said ramp and a free end movable into and out of said discharge area (40,42).

8. An apparatus as set forth in claim 7 further characterized by said ferrous element comprising small strips of ferrous steel.

9. An apparatus as set forth in claim 7 further characterized by said ferrous element comprising a plurality of ferrous wires.

10. An apparatus as set forth in claim 7 further characterized by said ferrous element comprising a ferrous chain.

11. An apparatus (10) for handling parts by magnetic attraction comprising: a cylindrical casing (18) of nonmagnetic material having an uninterrupted surface throughout its length; magnetizing means (20) for magnetically attracting parts of said casing (18); nonmagnetic ramp means spirally wound around said casing (18); drive means (26) for rotating said magnetic means (20) relative to said ramp means to cause parts to rotate about the axis of said casing (18) while said ramp means causes the parts to advance along the length of said casing; and characterized by part discharge sweeper means (44,46) for sweeping ferrous chips and fines to fall free from said magnetizing means (20) and being discharged upon rotation of said magnetizing means (20), said ramp means (30) including at least one discharge area (40,42), said sweeper means (44,46) including a ferrous element mounted at said discharge area (40,42) and having a fixed end mounted on said ramp and a free end movable into and out of said discharge area (40,42).

* * * * *